(12) United States Patent
Takori et al.

(10) Patent No.: US 12,503,040 B2
(45) Date of Patent: Dec. 23, 2025

(54) VEHICLE LIGHTING DEVICE

(71) Applicant: HONDA MOTOR CO., LTD., Tokyo (JP)

(72) Inventors: Masayoshi Takori, Saitama (JP); Yuji Tsuchiya, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 203 days.

(21) Appl. No.: 18/466,845

(22) Filed: Sep. 14, 2023

(65) Prior Publication Data

US 2024/0092252 A1 Mar. 21, 2024

(30) Foreign Application Priority Data

Sep. 16, 2022 (JP) ................................. 2022-148354

(51) Int. Cl.
*B60Q 1/24* (2006.01)
*B60Q 1/14* (2006.01)
*H05B 47/115* (2020.01)

(52) U.S. Cl.
CPC .............. *B60Q 1/24* (2013.01); *B60Q 1/143* (2013.01); *H05B 47/115* (2020.01); *B60Q 2300/054* (2013.01); *B60Q 2300/45* (2013.01)

(58) Field of Classification Search
CPC .... B60Q 1/24; B60Q 1/143; B60Q 2300/054; B60Q 2300/45; B60Q 1/12;

(Continued)

(56) References Cited

U.S. PATENT DOCUMENTS 10,352,523 B2 * 7/2019 Nishimura .............. F21S 41/27
2007/0019396 A1 1/2007 Kaiba
(Continued)

FOREIGN PATENT DOCUMENTS

JP 2000238576 A 9/2000
JP 2007246060 A 9/2007
(Continued)

OTHER PUBLICATIONS

Notification of Reasons for Refusal dated Apr. 16, 2024 issued in the JP Patent Application No. 2022-148354.

*Primary Examiner* — Abdullah A Riyami
*Assistant Examiner* — Syed M Kaiser
(74) *Attorney, Agent, or Firm* — CKC & Partners Co., LLC

(57) ABSTRACT

A vehicle lighting device is provided which can sufficiently improve overlooking of pedestrians by a driver. A vehicle lighting device of the present invention includes: a forward irradiation part (low-beam unit) that irradiates a forward irradiation region (low-beam irradiation region) of a vehicle; a lateral irradiation part (second cornering light unit) that irradiates a lateral irradiation region (right-side second cornering light irradiation region) on an outer side in the vehicle-width direction of the forward irradiation region; and a first pattern irradiation part (forward projector unit) that irradiates a first irradiation region (right-side forward projector unit irradiation region) that partially overlaps the forward irradiation region and lateral irradiation region in a top view in a bright/dark mixed irradiation region in which bright regions and dark regions are alternately repeated.

5 Claims, 15 Drawing Sheets

(58) Field of Classification Search
CPC .......... B60Q 2300/142; B60Q 2400/50; B60Q 1/085; H05B 47/115
See application file for complete search history.

(56) References Cited

U.S. PATENT DOCUMENTS

| | | |
|---|---|---|
| 2016/0229333 A1 | 8/2016 | Shiraki et al. |
| 2018/0038568 A1 | 2/2018 | Sawada |
| 2020/0284883 A1* | 9/2020 | Ferreira ................. G01S 7/4815 |
| 2021/0291722 A1* | 9/2021 | Kulkarni .................. G01S 15/58 |
| 2022/0176870 A1* | 6/2022 | Uesugi ..................... B60Q 1/08 |
| 2022/0281379 A1 | 9/2022 | Nakano et al. |
| 2022/0297597 A1* | 9/2022 | Ching .................. B60Q 1/0041 |

FOREIGN PATENT DOCUMENTS

| | | | | |
|---|---|---|---|---|
| JP | 2009220631 A | | 10/2009 | |
| JP | 2012183863 A | | 9/2012 | |
| JP | 2013184614 A | * | 9/2013 | ............. B60Q 1/143 |
| JP | 2016147534 A | | 8/2016 | |
| JP | 2018020683 A | | 2/2018 | |
| JP | 2022134577 A | | 9/2022 | |

\* cited by examiner

VEHICLE LIGHTING DEVICE

This application is based on and claims the benefit of priority from Japanese Patent Application No. 2022-148354, filed on 16 Sep. 2022, the content of which is incorporated herein by reference.

BACKGROUND OF THE INVENTION

Field of the Invention

The present invention relates to a vehicle lighting device.

Related Art

A device has been proposed which adjusts and controls an optical axis direction of the vehicle lighting device based on steering angle and vehicle speed (for example, refer to Patent Document 1). The vehicle lighting device of Patent Document 1 configures so as to change the conditions related to altered angle calculation of the optical axis direction, in response to the extent of the steering angle and vehicle speed.

Patent Document 1: Japanese Unexamined Patent Application, Publication No. 2007-246060

SUMMARY OF THE INVENTION

It is well known that there are many traffic accidents at intersections, and this type of accident is not seldom caused by overlooking of pedestrians. It must be ensured that such overlooking of pedestrians does not occur. With the technology of Patent Document 1, the optical axis direction of the vehicle lighting device is changed according to various conditions to improve visibility in the vicinity of a crosswalk. However, it is not considered necessarily possible to sufficiently take measures to prevent overlooking of pedestrians by only variously contriving conditions for changing the optical axis direction.

The present invention has been made taking account of the aforementioned such situation, and has an object of providing a vehicle lighting device which can sufficiently improve overlooking of pedestrians by a driver. In addition, it consequently has an object of contributing to the development of sustainable transportation systems which further improve traffic safety.

A vehicle lighting device (for example, the vehicle lighting device 1 described later) according to a first aspect of the present invention includes: a forward irradiation part (for example, the low-beam unit 6 and high-beam unit 5 described later) which irradiates a forward irradiation region (for example, the low-beam irradiation region 19 and high-beam irradiation region described later) ahead of a vehicle (for example, the vehicle 2 described later); a lateral irradiation part (for example, the second cornering light unit 8 and first cornering light unit 9 described later) which reacts to a left or right turn operation of a driver of the vehicle to irradiate a lateral irradiation region (for example, the left-side second cornering light irradiation region 21, right-side second cornering light irradiation region 22, left-side first cornering light irradiation region 23, and right-side first cornering light irradiation region 24 described later)) on an outer side in a vehicle-width direction of the forward irradiation region; and a first pattern irradiation part (for example, the forward projector unit 7 described later) which irradiates a first irradiation region (for example, the left-side forward projector unit irradiation region 25 and right-side forward projector unit irradiation region 26 described later) that partially overlaps the forward irradiation region and the lateral irradiation region in an top view in a bright/dark mixed irradiation pattern (for example, the rhombus lattice pattern 31 described later) in which bright regions (for example, the bright region 29 described later) and dark regions (for example, the dark region 30 described later) are alternately repeated.

According to a second aspect of the present invention, the vehicle lighting device as described in the first aspect further includes: a second pattern irradiation part (for example, the lateral projector unit 10 described later) which irradiates a second irradiation region (for example, the right-side lateral projector unit irradiation region 22 and left-side lateral projector unit irradiation region 25 described later) more rearwards than the lateral irradiation region in the bright/dark mixed irradiation pattern.

According to a third aspect of the present invention, in the vehicle lighting device as described in the second aspect, the second pattern irradiation part reacts to a right or left turn operation (for example, operation related to the turn signal switch 35 described later) of the driver and lights up.

According to a fourth aspect of the present invention, in the vehicle lighting device as described in the second aspect, the second pattern irradiation part lights up based on a detection output (for example, the second output of the LiDAR 33 described later) of a detection device (for example, the LiDAR 33 as the detection device 50 described later) that detects a pedestrian on a side of the vehicle during a right or left turn of the vehicle.

According to a fifth aspect of the present invention, in the vehicle lighting device as described in the first aspect, the first pattern irradiation part lights up based on a detection output (for example, the first output of the LiDAR 33 described later) of a detection device (for example, the LiDAR 33 as the detection device 50 described later) that detects a pedestrian on a side of a travel path of the vehicle.

With the vehicle lighting device of the first aspect, since the forward irradiation region ahead of the vehicle is irradiated by the forward irradiation part, and the lateral irradiation region on the outer side in the vehicle-width direction of the forward irradiation region is irradiated by the lateral irradiation part in reaction to a right or light turn operation by the driver, light is appropriately distributed in the field of view in the advancing direction of the vehicle. Furthermore, by the first pattern irradiation part, the first irradiation region partially overlapping the forward irradiation region and lateral irradiation region in a top view is irradiated in a bright/dark mixed irradiation pattern in which bright regions and dark regions are alternately repeated. The presence of a pedestrian in the first irradiation region in which part of the roadside is included is easily recognized by the driver by way of the visual characteristic of humans when viewing an object irradiated by light of the bright/dark mixed irradiation pattern. For this reason, it is possible to sufficiently improve overlooking of pedestrians by a driver. In addition, it consequently leads to further improvement in traffic safety and contribute to development of a sustainable transportation system.

With the vehicle lighting device of the second aspect, since the second pattern irradiation part irradiates the second irradiation region rearward of the lateral irradiation region with light of the bright/dark mixed irradiation pattern, the driver can reliably recognize the presence of pedestrians in the direction in which the vehicle is about to change course.

With the vehicle lighting device of the third aspect, since the second pattern irradiation part irradiates the second irradiation region rearward of the lateral irradiation region in reaction to a right or left turn operation by the driver with the light of the bright/dark mixed irradiation pattern, the driver can reliably recognize the presence of pedestrians in the direction in which the vehicle is about to change course.

With the vehicle lighting device of the fourth aspect, since the second pattern irradiation part lights up based on the detection output of the detection device detecting pedestrians on a side of the vehicle during a right or left turn of the vehicle, the driver can reliably recognize the presence of pedestrians in the direction in which the vehicle is about to change course.

With the vehicle lighting device of the fifth aspect, since the first pattern irradiation part lights up based on the detection output of the detection device detecting pedestrians on a side of the travel path of the vehicle, the driver can reliably recognize the presence of pedestrians on the roadside by the light illumination of the bright/dark mixed irradiation pattern from the first pattern irradiation part.

DETAILED DESCRIPTION OF THE INVENTION

Hereinafter, an embodiment of the present invention will be explained while referencing the drawings. It should be noted that, in the following explanation, an irradiation pattern light distribution region is an irradiation area of certain specific light, and an irradiation pattern is an irradiation form of light on the irradiation pattern light distribution region.

Figure 1:
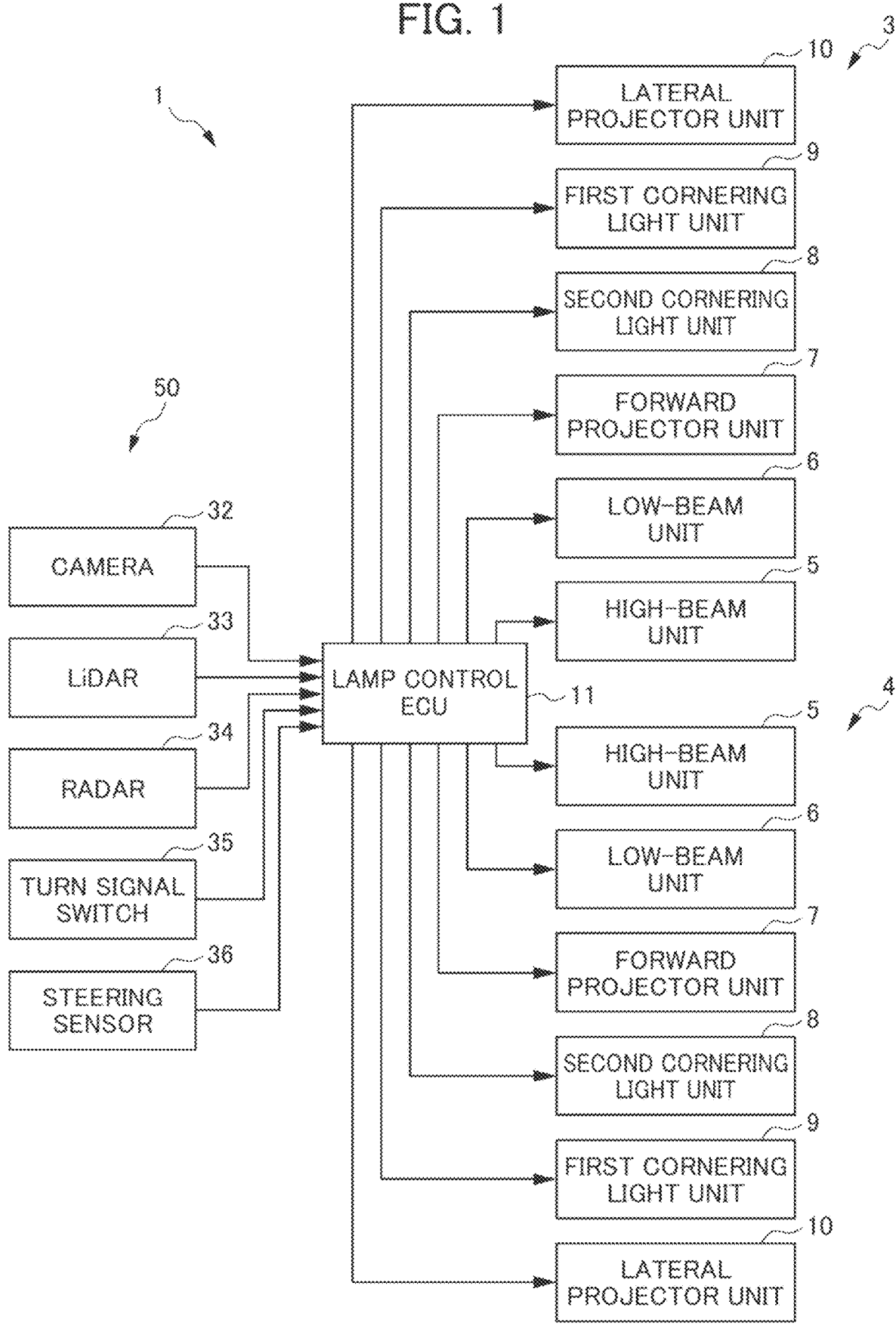
FIG. 1 is a block diagram showing a vehicle lighting device as an embodiment of the present invention.
Figure 2:
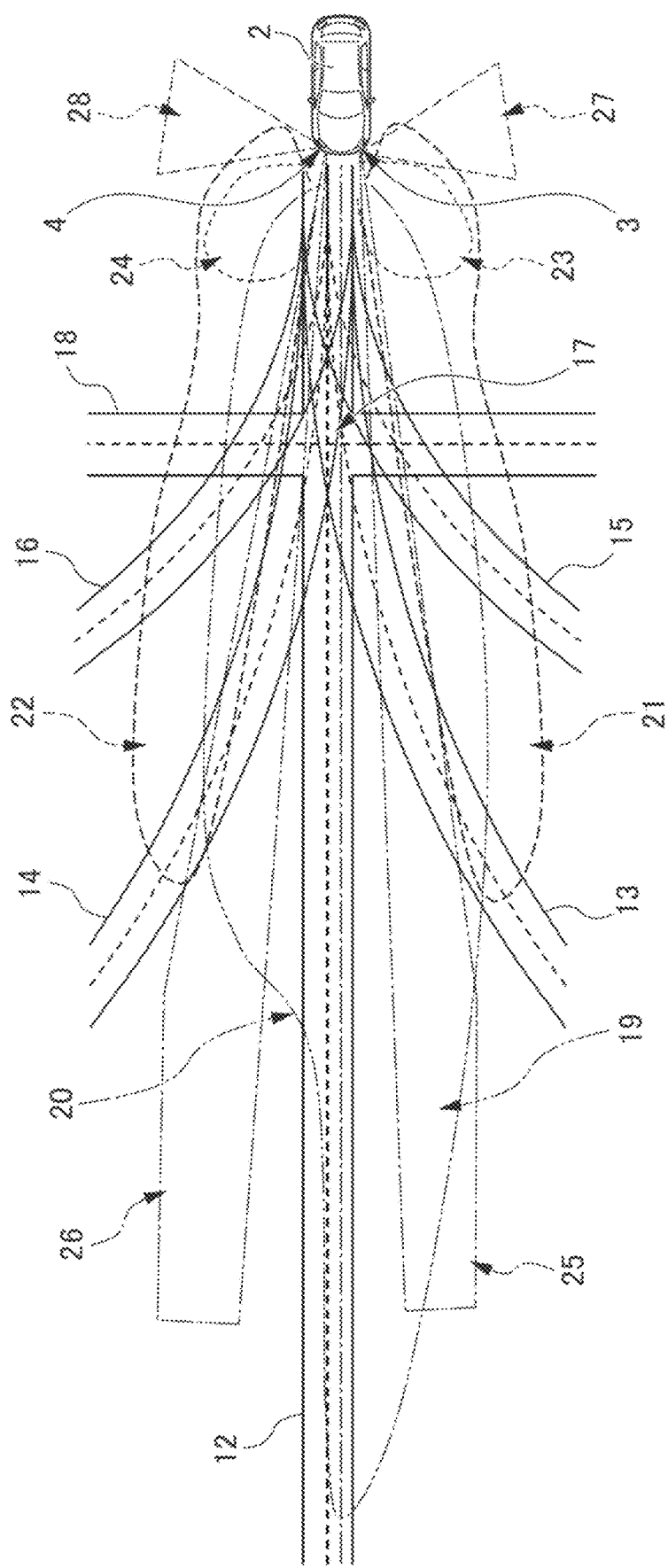
FIG. 2 is a schematic diagram showing an irradiation region of each lamp in the vehicle lighting device of FIG. 1.

FIG. 1 is a block diagram showing a vehicle lighting device 1 according to an embodiment of the present invention. FIG. 2 is a schematic diagram showing an irradiation region of each lamp of the vehicle lighting device 1 provided to a vehicle 2 from a top view. To each of a left-side headlight unit 3 and right-side headlight unit 4, a high-beam unit 5, low-beam unit 6, forward projector unit 7, second cornering light unit 8, first cornering light unit 9 and lateral projector unit 10 are arranged as lamps in order from an inner side to outer side in the vehicle-width direction of the vehicle 2. The respective lamps of each of the left-side headlight unit 3 and right-side headlight unit 4 operate under the control of the lamp control ECU 11. In the present disclosure, the low-beam unit 6 and high-beam unit 5 configure a forward irradiation part, the forward projector unit 7 configures a first pattern irradiation part, and the lateral projector unit 10 configures a second pattern irradiation part.

In the following explanation, the high-beam unit 5, low-beam unit 6, forward projector unit 7, second cornering light unit 8, first cornering light unit 9 and lateral projector unit 10 of the left-side headlight unit 3 are appropriately called a left-side high-beam unit 5, left-side low-beam unit 6, left-side forward projector unit 7, left-side second cornering light unit 8, left-side first cornering light unit 9 and left-side lateral projector unit 10.

Similarly, the high-beam unit 5, low-beam unit 6, forward projector unit 7, second cornering light unit 8, first cornering light unit 9 and lateral projector unit 10 of the right-side headlight unit 4 are appropriately called a right-side high-beam unit 5, right-side low-beam unit 6, right-side forward projector unit 7, right-side second cornering light unit 8, right-side first cornering light unit 9 and right-side lateral projector unit 10.

In FIG. 2, for convenience of explanation, for the roads of various forms on which the vehicle 2 travels, the approach end sides to which the vehicle 2 is heading are drawn to overlap. These roads include a straight road 12, gentle left curve road 13, gentle right curve road 14, sharp left curve road 15 and sharp right curve road 16 extending from the vehicle 2 ahead of the front thereof. In addition, a non-priority straight road 18 which intersects the straight road 12 at the intersection 17 ahead of the vehicle 2 is also drawn.

By the low-beam unit 6 of each of the left side and right-side, the low-beam irradiation region 19 extending from the vehicle 2 ahead of the front thereof is irradiated. The low-beam irradiation region 19 takes a left/right non-symmetric shape in which the irradiation region portion of an oncoming lane side is retreated more to the front side than the irradiation region portion of one's own lane side, in order to suppress dazzling of the oncoming vehicle.

The high-beam irradiation region (not shown) by each of the left-side and right-side high-beam units 5 extends from the vehicle 2 ahead of the front thereof so as to overlap a portion near the center line of the low-beam irradiation region 19 in a top view. The high-beam irradiation region is above the low-beam irradiation region 12 and narrows down more to extend farther. In the present disclosure, the low-beam irradiation region 12 or the irradiation region made by combining the low-beam irradiation region 19 and high-beam irradiation region is called a forward irradiation region.

The left-side second cornering light unit 8 turns ON in reaction to a left turn operation of the driver to irradiate the left-side second cornering light irradiation region 21 extending forward by substantially the same distance as a cut-off line corresponding portion 20 of the low-beam irradiation region 19, while partially overlapping the left side of the vehicle-width direction outside portion of the low-beam irradiation region 19, which is the forward irradiation region.

The right-side second cornering light unit 8 turns ON in reaction to a right turn operation of the driver to irradiate the right-side second cornering light irradiation region 22 extending forward by substantially the same distance as a cut-off line corresponding portion 20 of the low-beam irradiation region 19, while partially overlapping the vehicle-width direction outside portion of the low-beam irradiation region 19, which is the forward irradiation region.

The left-side first cornering light unit 9 turns ON in reaction to a left turn operation of the driver to irradiate the left-side first cornering light irradiation region 23 which partially overlaps the left side of the vehicle-width direction outside portion of the low-beam irradiation region 19, which is the forward irradiation region, and substantially overlaps a left-front side portion of the vehicle 2 of the left-side second cornering light irradiation region 21.

The right-side first cornering light unit 9 turns ON in reaction to a left turn operation of the driver to irradiate the right-side first cornering light irradiation region 24 which partially overlaps the right side of the vehicle-width direction outside portion of the low-beam irradiation region 19, which is the forward irradiation region, and substantially overlaps a right-front side portion of the vehicle 2 of the right-side second cornering light irradiation region 22.

In the present disclosure, the left-side second cornering light irradiation region 21, left-side first cornering light irradiation region 23, right-side second cornering light irradiation region and right-side first cornering light irradiation region 24, which are on the outer side in the vehicle-width direction of the low-beam irradiation region 19 that is the forward irradiation region, are collectively called a lateral irradiation region. The second cornering light units 8 and first cornering lights of the left side and right side constitute the lateral irradiation part that irradiates the lateral irradiation region.

The left-side forward projector unit 7 irradiates the left-side forward projector unit irradiation region 25 which partially overlaps in a top view the low-beam irradiation region 19 which is a forward irradiation region, and the left-side second cornering light irradiation region 21, which is a lateral irradiation region.

The right-side forward projector unit 7 irradiates the right-side forward projector unit irradiation region 26 which partially overlaps in a top view the low-beam irradiation region 19 which is a forward irradiation region, and the right-side second cornering light irradiation region 22, which is a lateral irradiation region.

In the present disclosure, the left-side forward projector unit irradiation region 25 and right-side forward projector unit irradiation region 26 are collectively called the first irradiation region. In addition, the left side and right side forward projector units 7 are collectively called the first pattern irradiation part. As described later, the first pattern irradiation part irradiates the first irradiation region in a bright/dark mixed irradiation pattern in which bright regions and dark regions are alternately repeated.

The left-side lateral projector unit 10 irradiates a left-side lateral projector unit irradiation region 27 which widens relatively minorly toward the left side at a front part of the vehicle 2 behind the low-beam irradiation region 19, which is the forward irradiation region.

The right-side lateral projector unit 10 irradiates a right-side lateral projector unit irradiation region 28 which widens relatively minorly toward the right side at a front part of the vehicle 2 behind the low-beam irradiation region 19, which is the forward irradiation region.

In the present disclosure, the left-side lateral projector unit irradiation region 27 and right-side lateral projector unit irradiation region 28 are collectively called a second irradiation region. In addition, the left side and right lateral projector units 10 are collectively called a second pattern irradiation part. As described later, the second pattern irradiation part irradiates the second irradiation region in the bright/dark mixed irradiation pattern in which bright regions and dark regions are alternately repeated.

The high-beam unit 5 includes a light emitting element which is the light source, a reflector, a light shield which defines the irradiation region and a lens. The light emitting element generates light by electric power being supplied from a power source (not shown), in response to a control signal from the lamp control ECU 11. The light from the light emitting element is reflected by the reflector. The reflected light from the reflector is irradiated from the lens toward the aforementioned high-beam irradiation region (not shown) defined by the light shield.

The low-beam unit 6 includes a light emitting element which is a light source, a reflector, a light shield which defines the irradiation region, and a lens. The light emitting element generates light by electric power being supplied from a power source (not shown), in response to a control signal from the lamp control ECU 11. The light from the light emitting element is reflected by the reflector. The reflected light from the reflector is irradiated from the lens towards the low-beam irradiation region 19 defined by the light shield.

The left side and right side forward projector units 7 and left side and right side lateral projector units 10 include light emitting elements that are light sources, a spatial light modulator and a lens. As the spatial light modulator, for example, it is possible to utilize one of a form which reflects light, while independently modulating the several reflecting elements as in a DMD (Digital Micromirror Device). In this case, the forward projector unit 7 and lateral projector unit 10 assume a configuration of a DLP (Digital Light Processing: registered trademark) system using DMD. The left side and right side forward projector units 7 can irradiate light in various predetermined irradiation patterns from the lens on each corresponding left-side forward projector unit irradiation region 25 and right-side forward projector unit irradiation region 26. Similarly for the left side and right side lateral projector units 10, it is possible to irradiate light in various predetermined irradiation patterns from the lens on each corresponding left-side lateral projector unit irradiation region 27 and right-side lateral projector unit irradiation region 28.

The left side and right side projector units 7 can irradiate light in various predetermined irradiation patterns in their capacity; however, in the present disclosure, it irradiates irradiation light on each corresponding left-side forward projector unit irradiation region 25 and right-side forward projector unit irradiation region 26 in the bright/dark mixed irradiation pattern in which bright regions and dark regions are alternately repeated. Similarly, the left side and right side lateral projector units 10 irradiate irradiation light on each corresponding left side lateral projector unit irradiation region 27 and right side lateral projector unit irradiation region 28 in the bright/dark mixed irradiation pattern in which bright regions and dark regions are alternately repeated.

Figure 3:
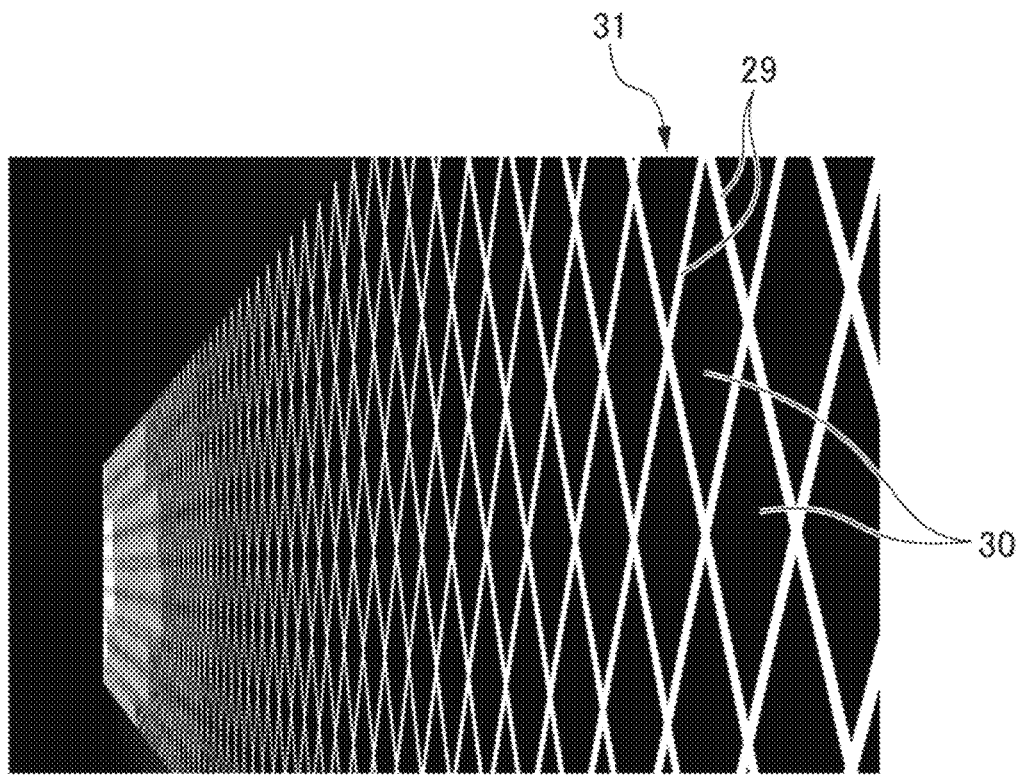
FIG. 3 is a schematic diagram showing irradiation of light in a bright/dark mixed irradiation pattern by the vehicle lighting device of FIG. 1.

FIG. 3 is a schematic diagram representatively showing the driving field of view at nighttime in the case of irradiating the irradiation light from the right-side projector unit 7 on the right-side forward projector unit irradiation region 26 in the bright/dark mixed irradiation pattern, for the left side and right side projector unit 7, and left side and right side lateral projector units 10. The bright/dark mixed irradiation pattern of FIG. 3 is particularly a rhombus lattice pattern 31 by the bright regions 29 of a mesh design of rhombus lattice and the dark regions 30 surrounded by these bright regions 29. The irradiation light of the rhombus lattice pattern 31 is irradiated similarly for the left-side projector unit 7, and left side and right side lateral projector units 10.

On the other hand, the respective outputs from the camera 32, LiDAR 33, radar 34, turn signal switch 35 and steering sensor 36 are supplied to the lamp control ECU 11. The camera 32 is provided so as to make the driving field of view of the driver as an imaging field of view at a position looking out the upper side of the front windshield of the vehicle 2. During travel of the vehicle 2, the light switch (not shown) is at the position of "AUTO", and when the camera 32 and other irradiation sensor create outputs corresponding to a state in which the brightness outside the vehicle declines by a predetermined control value, an operation mode of the vehicle lighting device 1 is set to low-beam mode by the lamp control ECU 11. The low-beam mode is an operation mode in which the low-beam unit 6 is turned ON. In addition, the operation mode in which the high-beam unit 5 is turned ON is the high-beam mode.

It should be noted that, when the vehicle 2 is traveling in the high-beam mode, if the camera 32 detects an oncoming vehicle or ahead traveling vehicle, or a certain number of street lights, the operation mode of the vehicle lighting device 1 is switched to the low-beam mode by the lamp control ECU 11. During the low-beam mode, the high-beam unit 5 is turned OFF, and the low-beam unit 6 irradiates the low-beam irradiation region 19 in FIG. 2, under the control by the lamp control ECU 11.

The LiDAR 33 and radar 34 detect various landmarks such pedestrians around the vehicle 2, and/or structures and other objects. Normally, the LiDAR 33 surpasses the detection accuracy of the radar 34; however, since the detection performance of radar 34 is superior during bad weather, etc., both can be used so as to function complimentarily. The detection outputs of each of the LiDAR 33 and radar 34 are supplied to the lamp control ECU 11. It should be noted that the LiDAR 33 supplies both outputs of a first output which is a landmark detection output related to a forward field of view; and a second output which is a landmark detection output related to a lateral field of view, to the lamp control ECU 11.

The turn signal switch 35 creates an output of a predetermined switch signal according to an operation on the turn signal lever (not shown), and this output is supplied to the lamp control ECU 11. The steering sensor 36 creates a steering angle detection output corresponding to steering angle, and this steering angle detection output is supplied to the lamp control ECU 11. When the power mode of the vehicle 2 is ON mode, and the vehicle speed detected by a speedometer (not shown) is not more than a predetermined speed, if the low-beam unit 6 is turned ON, the lamp control ECU 11 sets the first cornering light unit 9 and second cornering light unit to lighting mode, in response to the detection output from the turn signal switch 35 or steering sensor 36.

Figure 4:
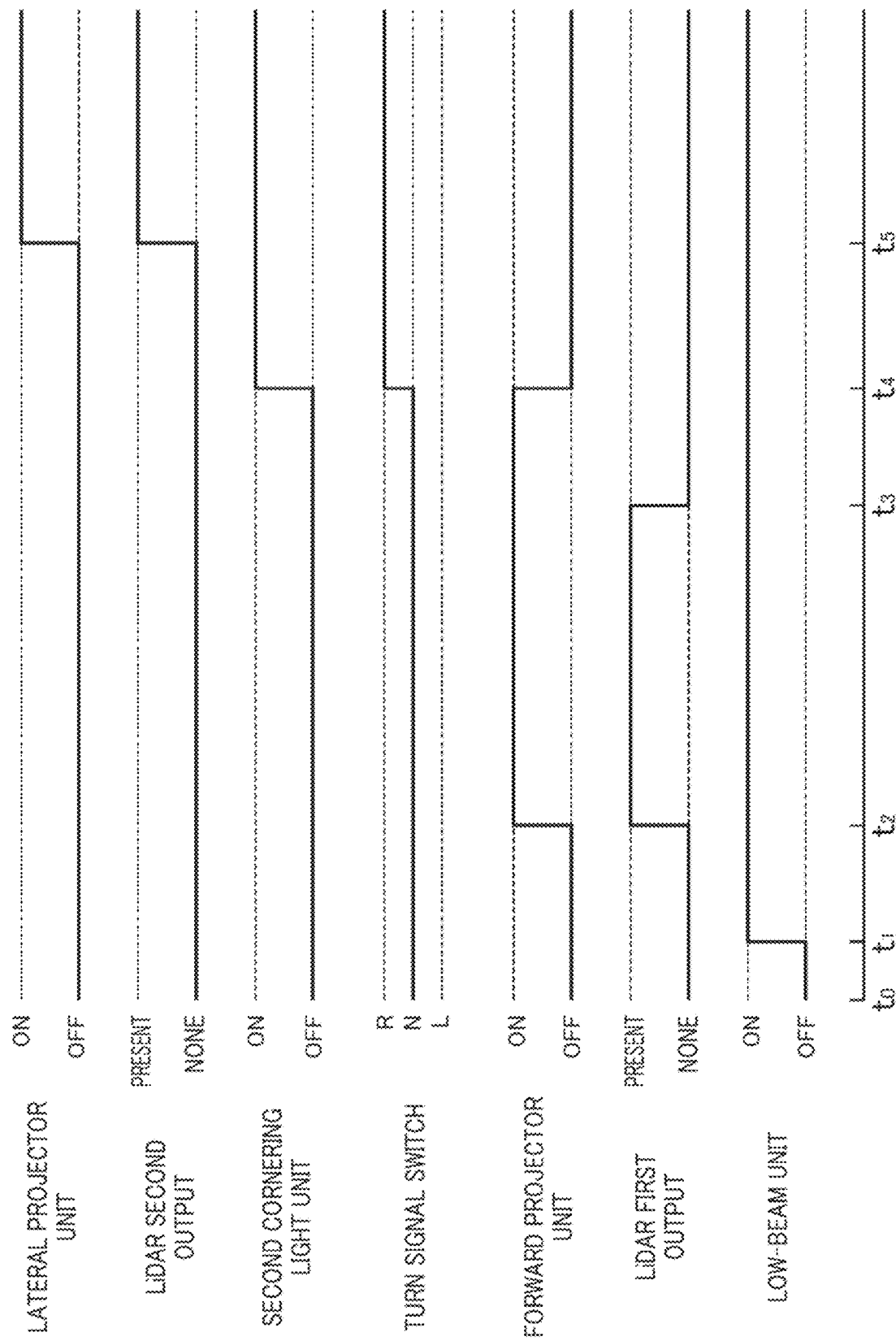
FIG. 4 is a timing chart showing an example of operation of the vehicle lighting device of FIG. 1.

Next, an example of operation of the aforementioned respective lamps upon making a right turn at an ahead intersection 17 from a state in which the vehicle 2 is traveling on a straight road 12 will be explained by referencing FIGS. 4 to 11. FIG. 4 is a timing chart showing an example of operation of each lamp of the left-side headlight unit 3 and right-side headlight unit 4.

Figure 5:
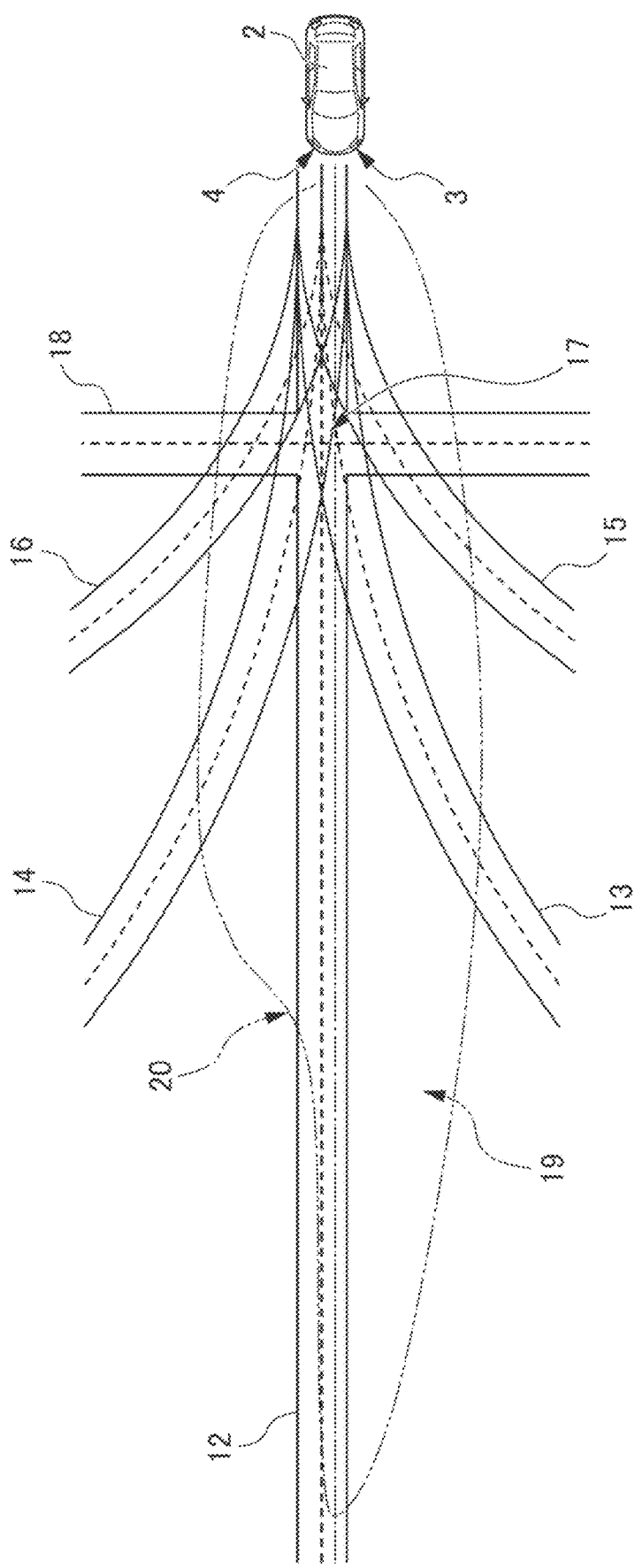
FIG. 5 is a view showing an example of an irradiation form of light by the vehicle lighting device of FIG. 1.

In FIG. 4, the starting time of an elapse time in the case of the vehicle 2 traveling on the straight road 12 is defined as time t0, and thereafter, represented as times t1, t2, t3, t4 and t5 in order of the elapse of time. Herein, at time t0, the low-beam unit 6 is turned OFF. At time t1, the aforementioned lighting condition is sufficient and the low-beam unit 6 is turned ON, and subsequently, lighting of the low-beam unit 6 is maintained. An aspect of the low-beam irradiation region 19 is irradiating by the lighting of the low-beam unit 6 at time t1 is shown in FIG. 5.

Figure 6:
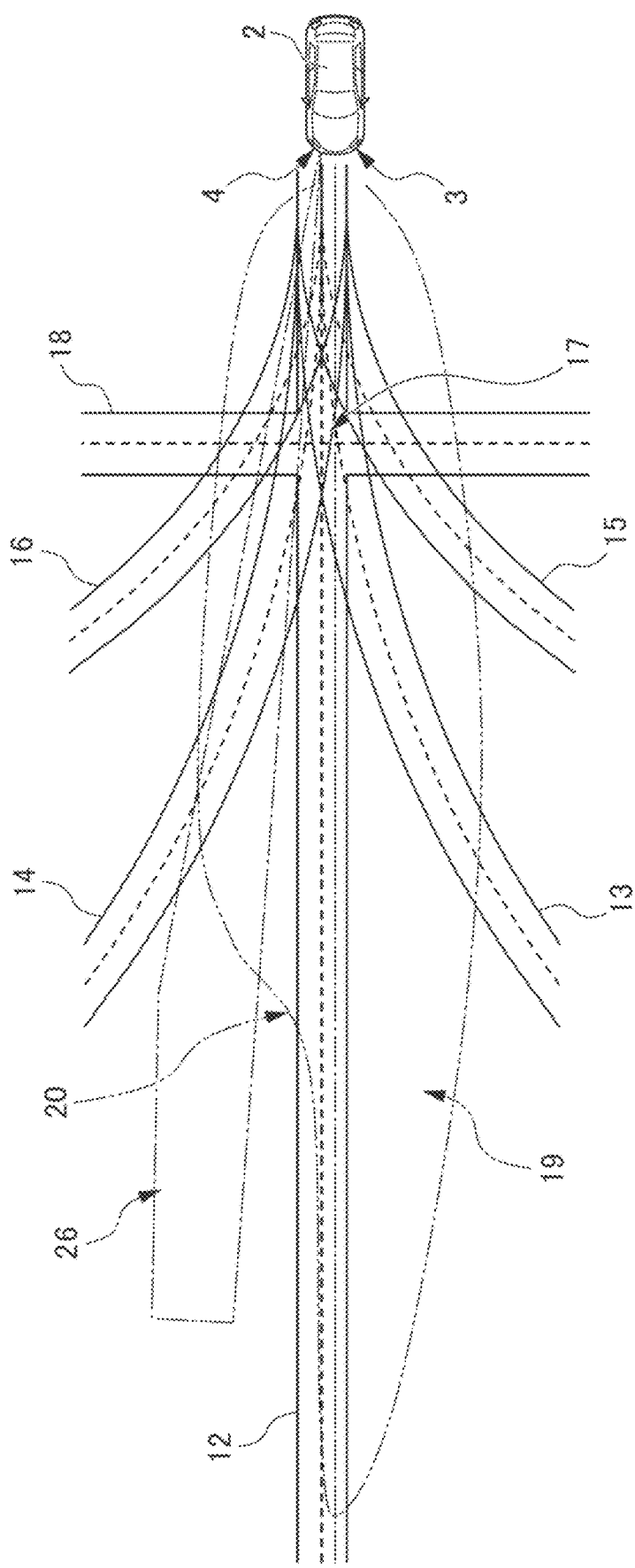
FIG. 6 is a view showing an irradiation form adding the irradiation of light by a first pattern irradiation part in the vehicle lighting device of FIG. 1 to the irradiation form of FIG. 5.
Figure 7:
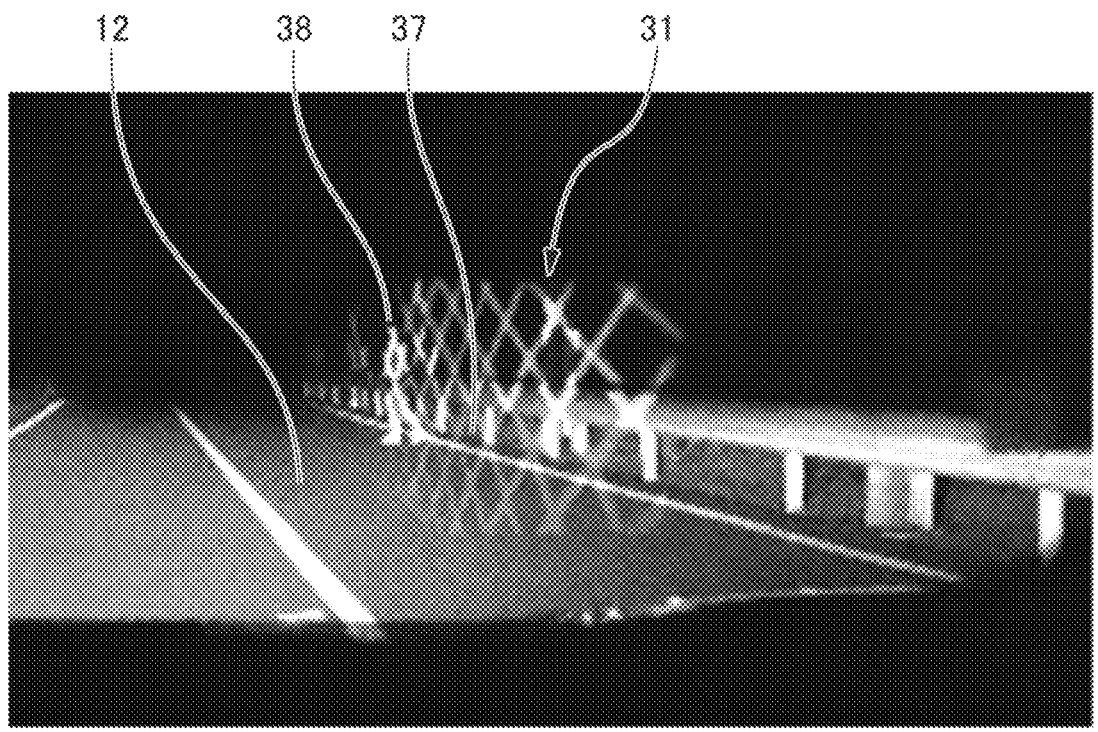
FIG. 7 is a view showing a driving field of view at nighttime when irradiation of light is performed in the irradiation form of FIG. 6.

When the vehicle 2 continues traveling, and the LiDAR 33 detects the existence of a landmark such as a pedestrian at the right front field of view at time t2, the first output of the LiDAR 33 turns from the corresponding value of landmark "none" to the corresponding value of landmark "present". The lamp control ECU 11 having received this first output from the LiDAR 33 turns on the right-side forward projector unit 7. The right-side forward projector unit 7 thereby irradiates the right-side forward projector unit irradiation region 26 in the rhombus lattice pattern 31. At time t2, an aspect of the right-side forward projector unit 7 turning ON in addition to the low-beam unit 6 is shown in FIG. 6. In addition, FIG. 7 shows an example of a driving field of view at nighttime in a case of the right-side forward projector unit 7 turned ON. By the irradiation light of the rhombus lattice pattern 31 irradiated to the right front of the straight road 12 from the right-side forward projector unit 7, the pedestrian 38 on the roadside 37 is remarkably recognized from the driver, by way of the visual characteristic of humans when viewing an irradiated object. For this reason, the overlooking of the pedestrian 38 by the driver is prevented.

When reaching time t3, the first output of the LiDAR 33 returns from the corresponding value of landmark "present" to corresponding value of "landmark "none" according to the relative movement between the vehicle 2 and pedestrian 38. In the present example, even when reaching time t3, the right-side forward projector unit 7 maintains the lighting state. At time t4, when a right turn operation on the turn signal lever is performed, the output corresponding to the right turn operation from the turn signal switch 35 is supplied to the lamp control ECU 11. The lamp control ECU 11 turns ON the second cornering light unit 8, in response to this output from the turn signal switch 35. Although omitted from illustration, it may be configured to light the first cornering light unit 9 simultaneously with lighting of the second cornering light unit 8. On the other hand, in the present example, the forward projector unit 7 is turned off by the lamp control ECU 11 simultaneously with lighting of the second cornering light unit 8. It should be noted that, even at the aforementioned time t3 and later, it may be configured to maintain lighting of the forward projector unit 7.

Figure 8:
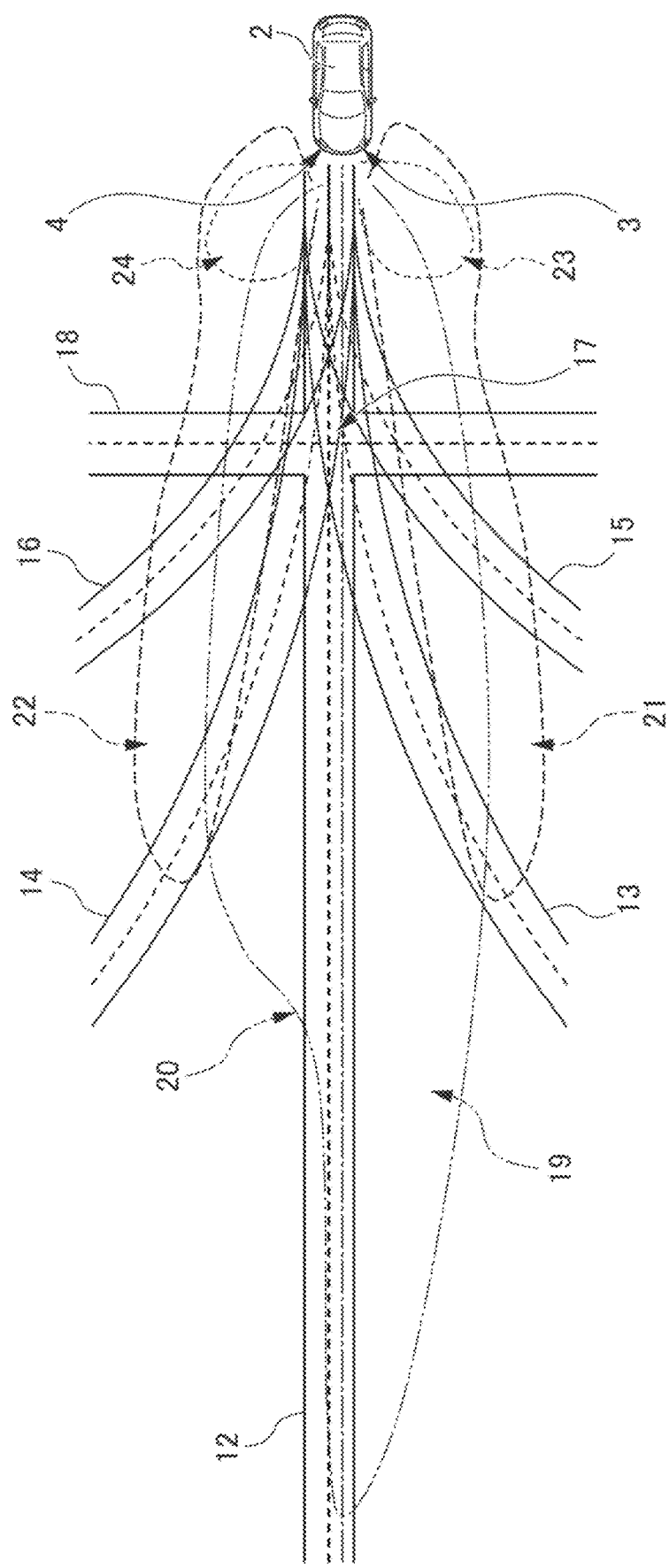
FIG. 8 is a view showing an irradiation form adding irradiation of light by a lateral irradiation part of the vehicle lighting device of FIG. 1 to the irradiation form of FIG. 5.
Figure 9:
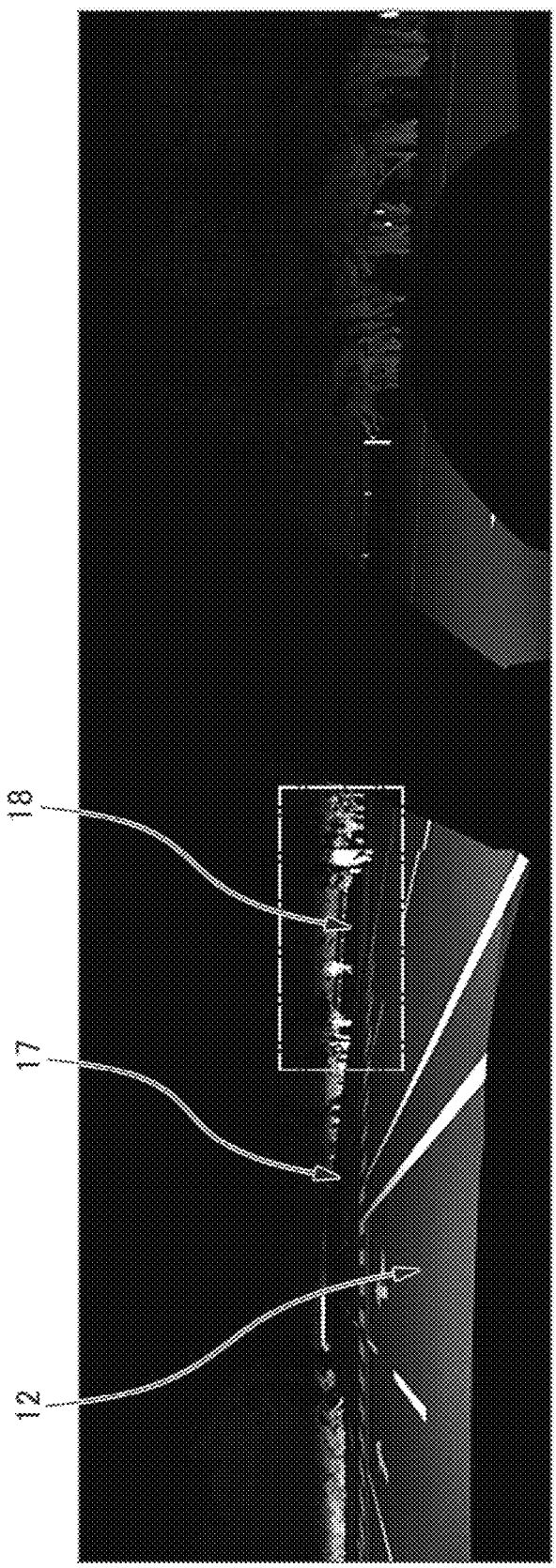
FIG. 9 is a view showing a driving field of view at nighttime when irradiation of light is performed in the irradiation form of FIG. 7.

An aspect of the left/right second cornering light irradiation regions 21, 22 being irradiated by lighting of the second cornering light unit 8 at time t4 is shown in FIG. 8. In addition, FIG. 9 shows an example of the driving field of view at nighttime in a case of the second cornering light unit 8 turning ON. The region on the side of the non-priority straight road 18 on which the vehicle 2 is about enter a right turn in the intersection 17 ahead of the straight road 12 is brightly irradiated by the second cornering light unit 8. For this reason, the driver can clearly see the situation in the approaching direction of the vehicle 2.

At time t5, when the LiDAR 33 detects a pedestrian in the right-side field of view, the second output of the LiDAR 33 turns from the corresponding value of landmark "none" to the corresponding value of landmark "present". The lamp control ECU 11 having received this second output from the LiDAR 33 turns ON the right-side lateral projector unit 10. The right-side lateral projector unit 10 thereby irradiates the right-side lateral projector unit irradiation region 28 in the rhombus lattice pattern 31.

Figure 10:
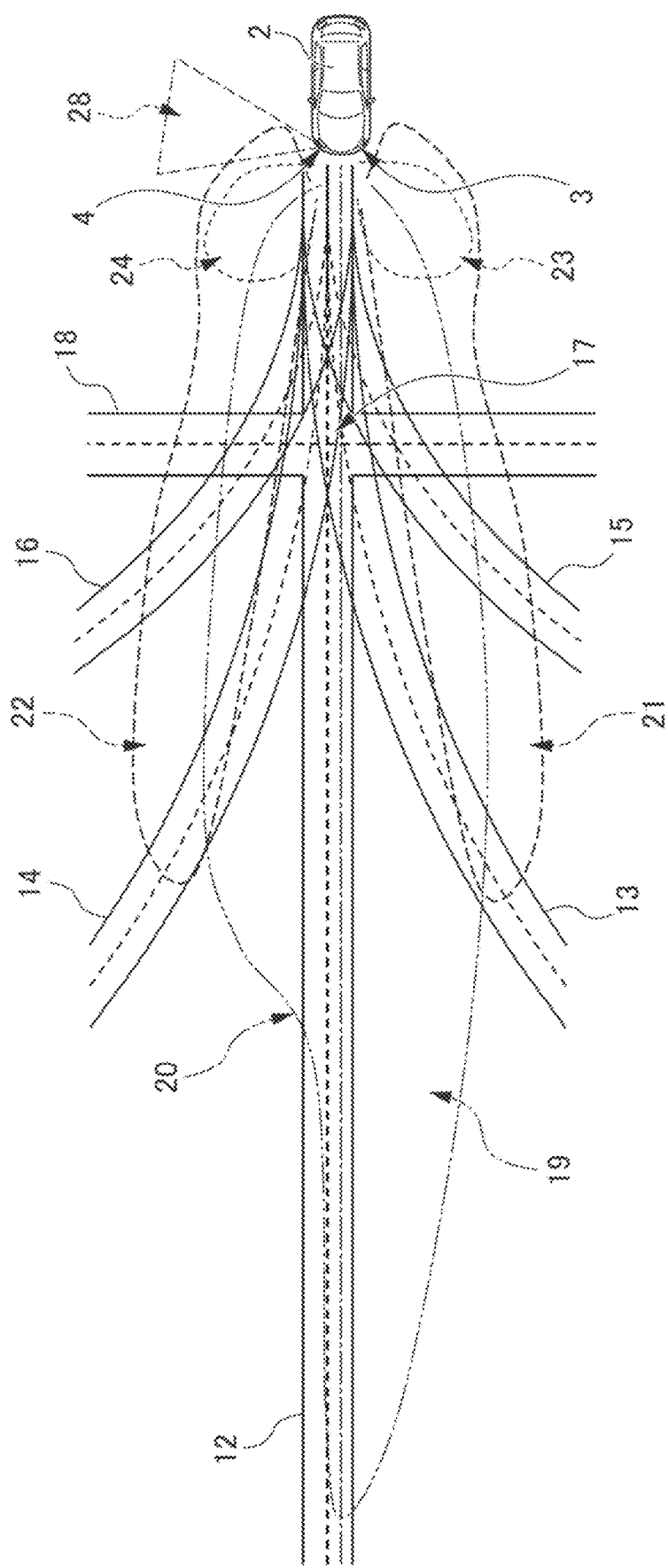
FIG. 10 is a view showing an irradiation form adding the irradiation of light by a second pattern irradiation part to the irradiation form of FIG. 8.
Figure 11:
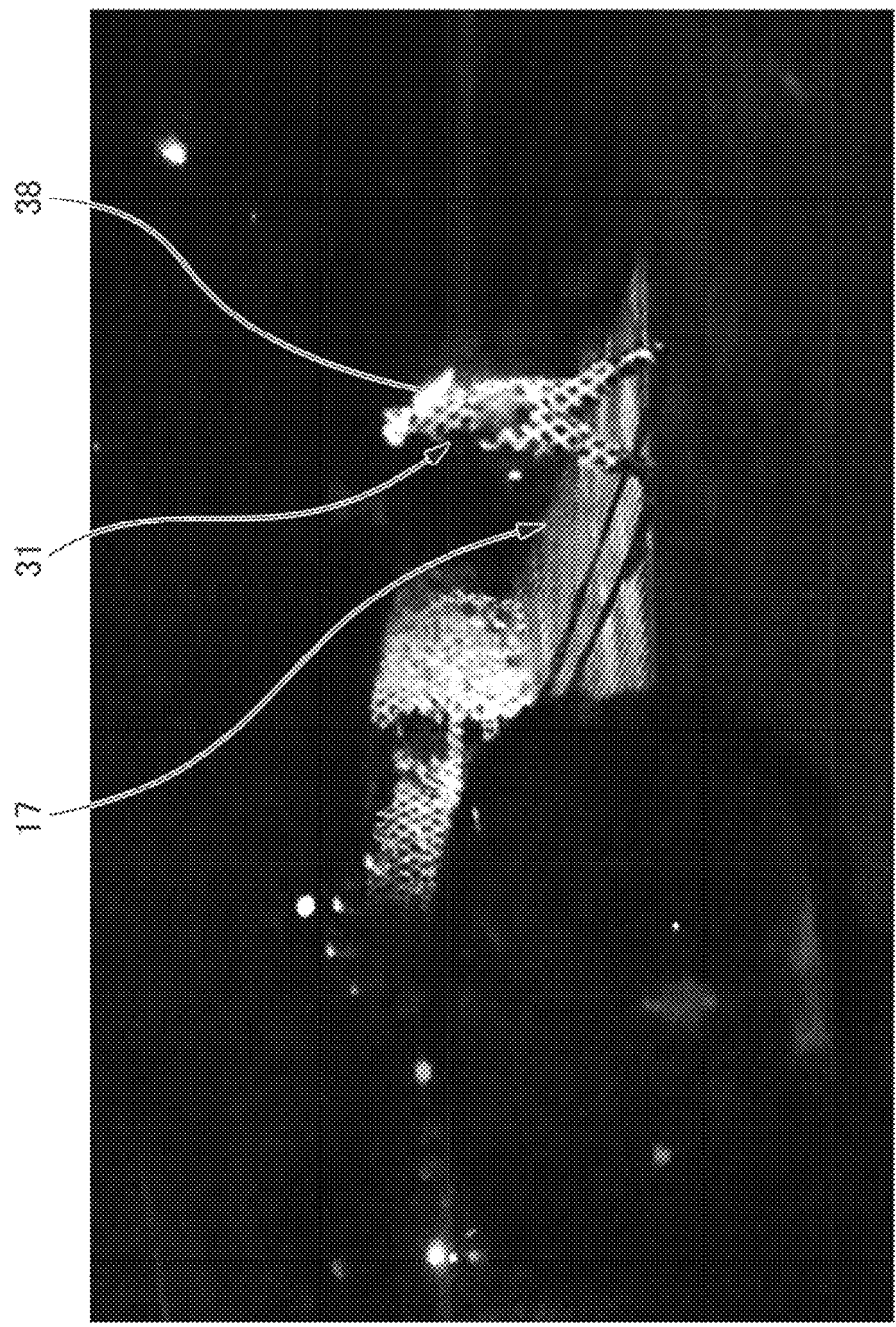
FIG. 11 is a view showing a driving field of view at nighttime when irradiation of light is performed in the irradiation form of FIG. 10.

An aspect of the right-side lateral projector unit irradiation region 28 being irradiated by lighting of the right-side lateral projector unit 10 at time t5 is shown in FIG. 10. In addition, FIG. 11 shows an example of the driving field of view at nighttime in the case of the right-side lateral projector unit 10 turned ON. By the irradiation light of the rhombus lattice pattern 31 by the right-side lateral projector unit 10, the presence of the pedestrian 38 crossing the intersection 17 is remarkably recognized from the driver. For this reason, overlooking of the pedestrian 38 by the pedestrian is prevented. It should be noted that, in the case of assuming a mode lighting the first cornering light unit 9 simultaneously with lighting of the second cornering light unit 8 at time 4, it may be configured to turn OFF the second cornering light unit 8 at time t5 to reduce dazzling of the pedestrian 38.

Figure 12:
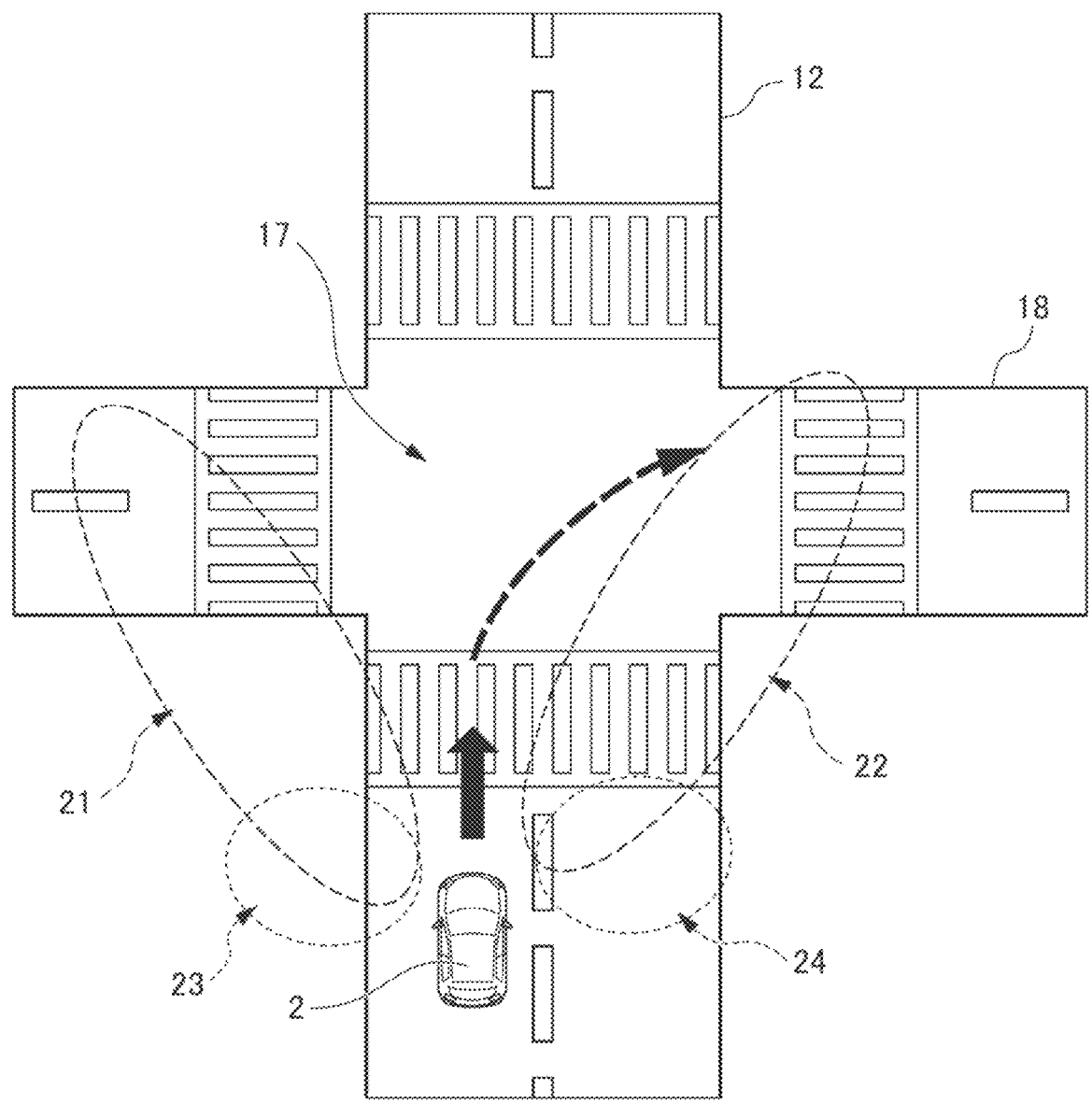
FIG. 12 is a view showing an irradiation form of light by a lateral irradiation part of the vehicle lighting device of FIG. 1 when a vehicle is about to enter an intersection.

Next, operation of the left/right second cornering light units 8 and left/right first cornering light units 9 will be explained by referencing FIG. 12. FIG. 12 is a top view showing the irradiation form of light by the left/right second cornering light units 8 and left/right first cornering light units 9 in FIG. 1 upon the vehicle 2 about to enter the intersection 17. In response to the output of the turn signal switch 35 by the operation by the driver of the vehicle 2 on the turn signal lever, the lamp control ECU 11 turns ON the left/right second cornering light units 8 and left/right first cornering light units 9. It should be noted that, in FIG. 12, illustration of the irradiation region of the low-beam unit 6 which is turned ON as normal during nighttime travel is omitted.

Figure 13A:
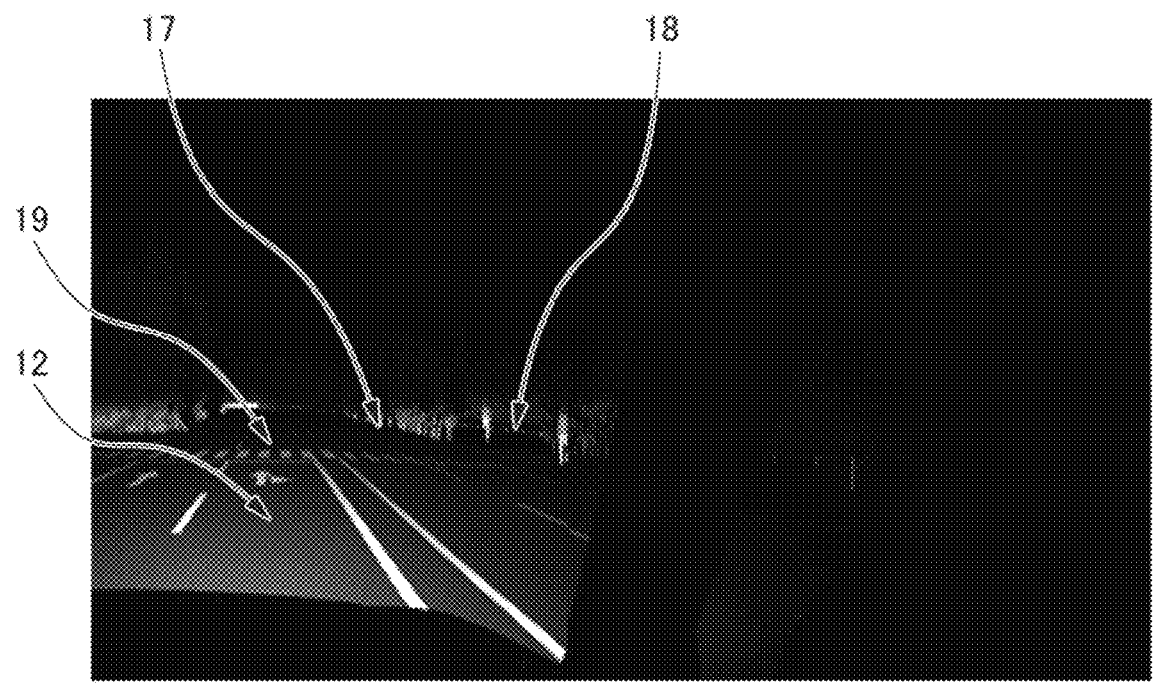
FIG. 13A is a view showing a driving field of view at nighttime in a case of a lateral irradiation part of the vehicle lighting device of FIG. 1 being turned OFF when a vehicle is about to enter an intersection.
Figure 13B:
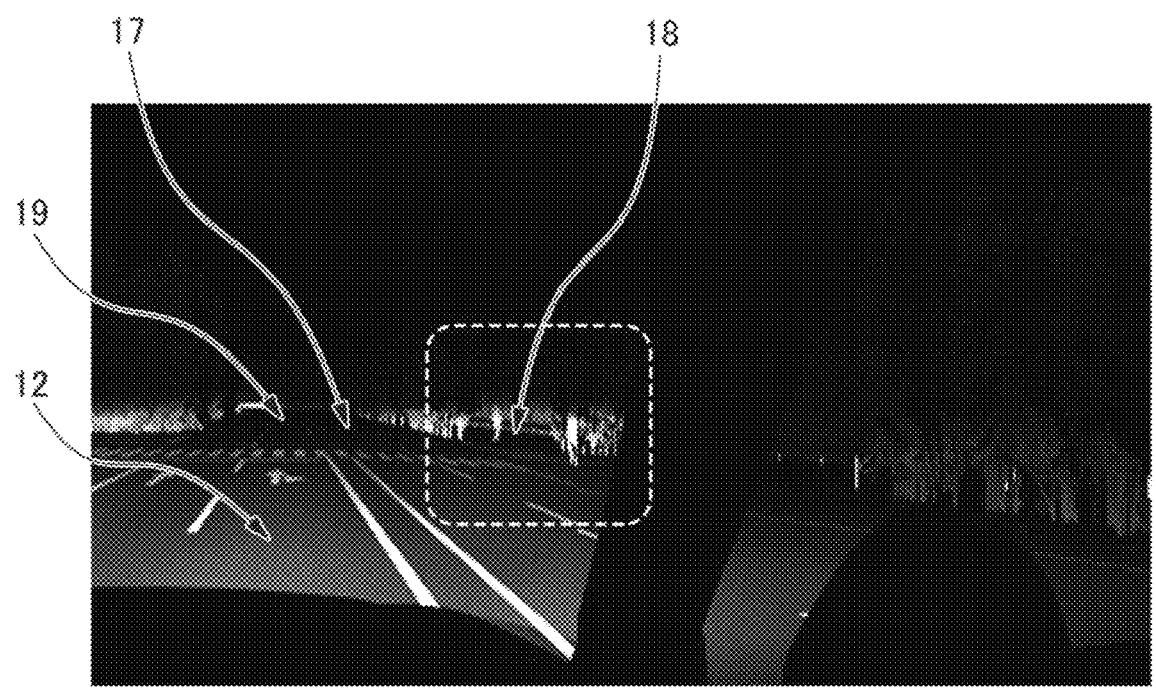
FIG. 13B is a view showing a driving field of view at nighttime in a case of a lateral irradiation part of the vehicle lighting device of FIG. 1 being turned ON when a vehicle is about to enter an intersection.

FIG. 13A is a view showing the driving field of view at nighttime in the vicinity of the intersection 17 in the case of the low-beam unit 6 being turned ON, and the second cornering light unit 8 and first cornering light unit 9 being turned OFF. FIG. 13B is a view showing the driving field of view at nighttime in the vicinity of the intersection 17 in the case of the low-beam unit 6 being turned ON, and the second cornering light unit 8 and first cornering light unit 9 being turned ON. In the case of FIG. 13A, although the low-beam irradiation region 19 is irradiated by the low-beam unit 6, the region in the advancing direction to the non-priority straight road 18 of the intersection 17 of the straight road 12 on which the vehicle 2 is traveling is somewhat dark. In contrast, in the case of FIG. 13B, since the second cornering light unit 8 and first cornering light unit 9 light up in addition to the low-beam unit 6, it is brightly illuminated until the region in the advancing direction of the non-priority straight road 18 of the intersection 17 of the straight road 12 on which the vehicle 2 is traveling. For this reason, overlooking of pedestrians while crossing the intersection by the driver is prevented.

Figure 14:
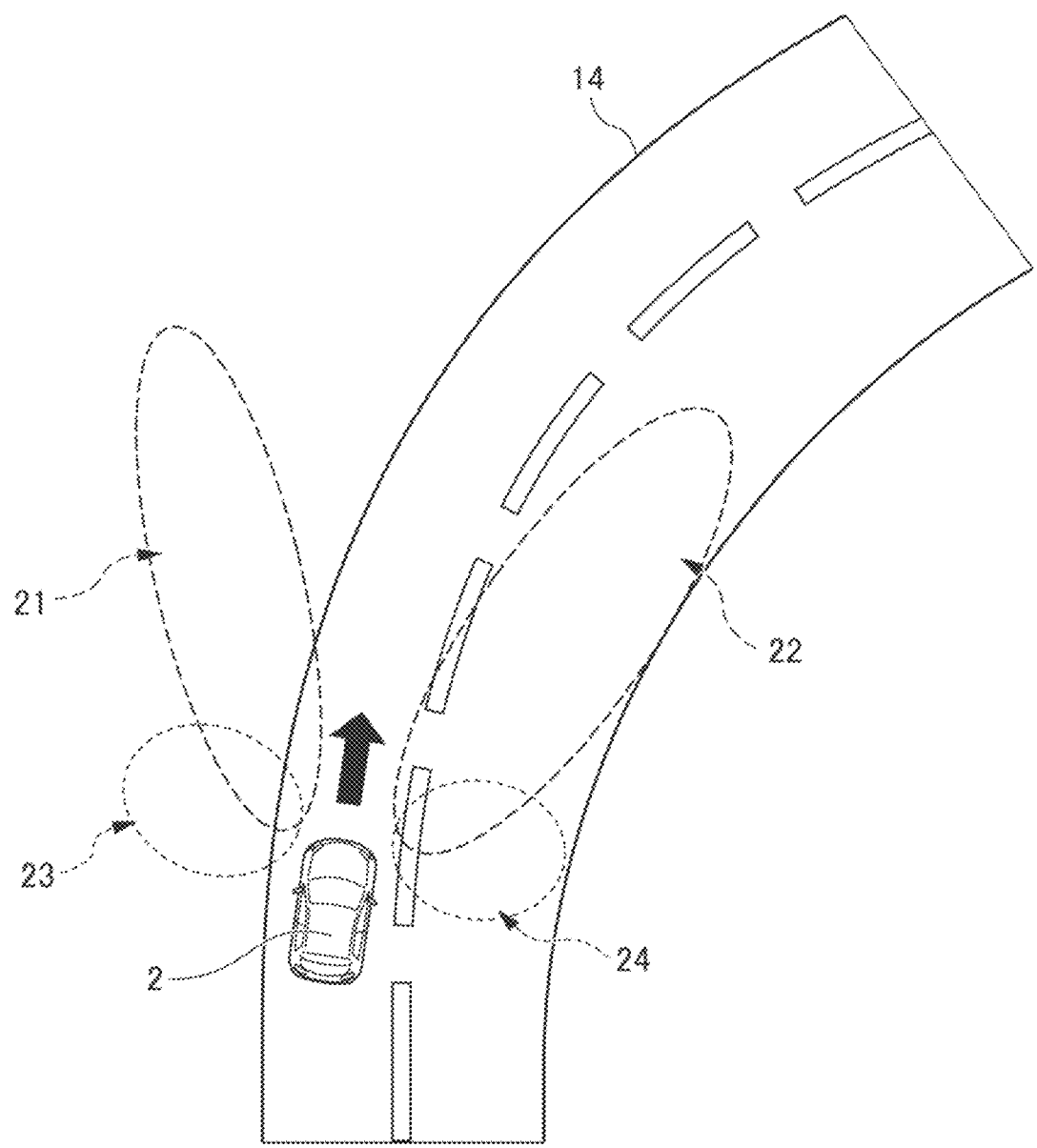
FIG. 14 is a view showing an irradiation form of light by a lateral irradiation part of the vehicle lighting device of FIG. 1 when a vehicle enters a curved road.

FIG. 14 is a top view showing the irradiation form of light by the left/right second cornering light units 8 and left/right first cornering light units 9 in FIG. 1 upon the vehicle 2 entering a sharp right curve road 16. In this case, in response to the steering angle detection output of the steering sensor 36 according to a steering operation by the driver of the vehicle 2, the lamp control ECU 11 turns ON the left/right second cornering light units 8 and left/right first cornering light units 9. It should be noted that, in FIG. 14, illustration of the irradiation region of the low-beam unit 6 which is turned ON as normal during nighttime travel is omitted. It should be noted that it may be configured so that the vehicle 2 entering the sharp right curve road 16 is deduced by the lamp control ECU 11 based on the imaging output from the camera 32 or output of a car navigation system (not shown), and turn ON the left/right second cornering light units 8 and left/right first cornering light units 9 depending on this result.

Figure 15A:
FIG. 15A is a view showing a driving field of view at nighttime in a case of a lateral irradiation part of the vehicle lighting device of FIG. 1 being turned OFF when a vehicle enters a curved road.
Figure 15B:
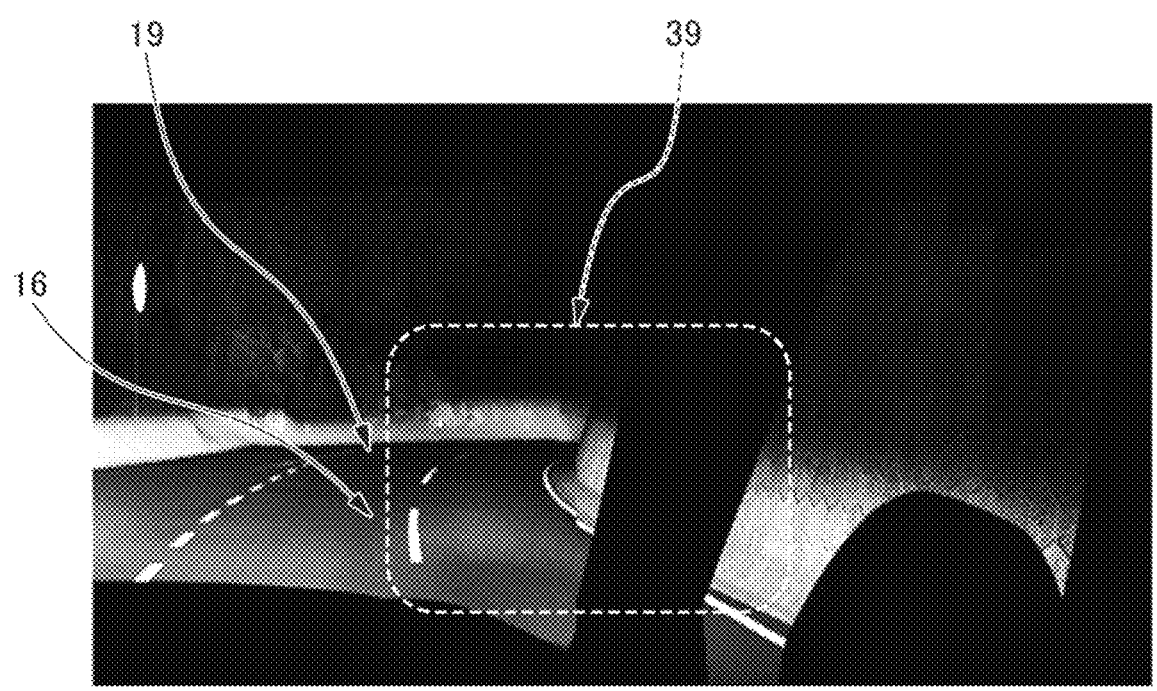
FIG. 15B is a view showing a driving field of view at nighttime in a case of a lateral irradiation part of the vehicle lighting device of FIG. 1 being turned ON when a vehicle enters a curved road.

FIG. 15A is a view showing a driving field of view at nighttime in the case of the low-beam unit 6 turned ON, and the second cornering light unit 8 and first cornering light unit 9 turned off, upon the vehicle 2 entering the sharp right curve road 16. FIG. 15B is a view showing a driving field of view at nighttime in the case of the low-beam unit 6 turned ON, and the second cornering light unit 8 and first cornering light unit 9 also turned ON, upon the vehicle 2 entering the sharp right curve road 16. In the case of FIG. 15A, the low-beam irradiation region 19 is irradiated by the low-beam unit 6; however, the region in the advancing direction of the sharp right curve road 16 ahead of the vehicle 2 is somewhat dark. In contrast, in the case of FIG. 15B, since the second cornering light unit 8 and first cornering light unit 9 are turned ON in addition to the low-beam unit 6, it is brightly illuminated until the region 39 in the advancing direction of the sharp right curve road 16 ahead of the vehicle 2. For this reason, the visibility of the driving field of view at nighttime of a curve road improves. It should be noted that, although a case of the steering angle detection output of the steering sensor 36 corresponding to the sharp right curve road 16 is explained, the second cornering light unit 8 and first cornering light unit 9 are turned ON also in the case of the steering angle detection output corresponding to a sharp left curve road 15. On the other hand, in the case of the steering angle detection output of the steering sensor 36 corresponding to the shaft right curve road 14 or sharp left curve road, the second cornering light unit 8 and first cornering light unit 9 are not turned ON, and electrical savings is achieved.

According to the vehicle lighting device 1 of the present embodiment, the following effects are exerted.

(1) The vehicle lighting device 1 includes: the low-beam unit 6 as a forward irradiation part that irradiates the low-beam irradiation region 19 that is a forward irradiation region ahead of the vehicle 2; the left side and right side second cornering light units 8, as well as left side and right side first cornering light units 9, as lateral irradiation parts that react to an operation of the driver of the vehicle 2 on the turn signal lever, which is a left/right turn operation. The left side and right side second cornering light units 8, as well as left side and right side first cornering light units 9 irradiate the lateral irradiation region on the outer side in the vehicle-width direction of the forward irradiation region. The lateral irradiation region includes: the left-side second cornering light irradiation region 21, right-side second cornering light irradiation region 22, left-side first cornering light irradiation region 23 and right-side first cornering light irradiation region 24. In addition, the vehicle lighting device 1 includes the forward projector unit 7 as the first pattern irradiation part. The forward projector unit 7 irradiates the left-side forward projector unit irradiation region 25 and right-side forward projector unit irradiation region 26, which are the first irradiation region partially overlapping the forward irradiation region and lateral irradiation region in a top view. The forward projector unit 7 irradiates the first irradiation region in the rhombus lattice pattern 31, which is a bright/dark mixed irradiation pattern in which the bright regions 29 and dark regions 30 are alternately repeated. Light is thereby appropriately distributed on the field of view in the advancing direction of the vehicle 2. Furthermore, the right-side forward projector unit irradiation region 26 is irradiated in the rhombus lattice pattern 31 by the forward projector unit 7. By the visual characteristic of humans when viewing an object irradiated by the light of the rhombus lattice pattern 31, the presence of a pedestrian in the first irradiation region in which a portion of the roadside is included is easily recognized from the driver. For this reason, it is possible to sufficiently improve overlooking of pedestrians by a driver. This is similar even upon the vehicle 2 making a left turn.

(2) With the vehicle lighting device 1, the lateral projector unit 10 as the second pattern irradiation part irradiates the right-side lateral projector unit irradiation region 22 and left-side lateral projector unit irradiation region 25, which are the second irradiation region behind the lateral irradiation region, with the light of the rhombus lattice pattern 31. The presence of a pedestrian in a direction in which the vehicle is about to change course can thereby be reliable recognized by the driver, by way of the visual characteristic of humans when viewing the object irradiated by light of the rhombus lattice pattern 31.

(3) With the vehicle lighting device 1, the lateral projector unit 10 turns ON according to the output of the turn signal switch 35 reacting to an operation of the driver on the turn signal lever, which is a right or left turn operation. For this reason, the presence of pedestrians in a direction in which the vehicle 2 is about to change course can be reliably recognized by the driver.

(4) With the vehicle lighting device 1, the lateral projector unit 10 turns ON based on the second output which is the detection output of the LiDAR 33 as the detection device 50 detecting a pedestrian on the side of the vehicle 2 during right or left turning of the vehicle 2. For this reason, the presence of pedestrians in a direction in which the vehicle 2 is about to change course can be reliably recognized by the driver.

(5) With the vehicle lighting device 1, the forward projector unit 7 turns ON based on the first output, which is the detection output of the LiDAR 33 as the detection device 50 detecting a pedestrian on a side of the traveling road of the vehicle 2. For this reason, the driver can reliably recognize the presence of the pedestrian 38 on the roadside 37 of the traveling road of the vehicle 2.

Although an embodiment of the present invention has been explained above, the present invention is not limited thereto. The configurations of detailed parts may be modified as appropriate within the scope of the gist of the present invention. In the aforementioned embodiment, the forward projector unit 7 adopted a configuration which turns ON based on the first output that is the detection output of the LiDAR 33 as the detection device 50 detecting a pedestrian on the side of the traveling road of the vehicle 2. Alternatively, for example, a configuration may be adopted that applies the camera 32 or radar 34 as the detection device 50, and turns ON the forward projector unit 7 based on the outputs of these.

EXPLANATION OF REFERENCE NUMERALS 1 vehicle lighting device
2 vehicle
3 left-side headlight unit
4 right-side headlight unit
5 high-beam unit
6 low-beam unit
7 forward projector unit (first pattern irradiation part)
8 second cornering light unit
9 first cornering light unit
10 lateral projector unit (second pattern irradiation part)
11 lamp control ECU
12 straight road
13 gentle left curve road
14 gentle right curve road
15 sharp left curve road
16 shape right curve road
17 intersection
18 non-priority straight road
19 low-beam irradiation region
20 cut-off line corresponding portion
21 left-side second cornering light irradiation region
22 right-side second cornering light irradiation region
23 left-side first cornering light irradiation region
24 right-side first cornering light irradiation region
25 left-side forward projector unit irradiation region (first irradiation region)
26 right-side forward projector unit irradiation region (first irradiation region)
27 left-side lateral projector unit irradiation region (second irradiation region)
28 right-side lateral projector unit irradiation region (second irradiation region)
29 bright region
30 dark region
31 rhombus lattice pattern
32 camera
33 LiDAR
34 radar
35 turn signal switch
36 steering sensor
37 roadside
38 pedestrian
39 advancing direction region
50 detection device

What is claimed is:
1. A vehicle lighting device comprising:
a forward irradiation part which irradiates a forward irradiation region ahead of a vehicle;
a lateral irradiation part which reacts to a left or right turn operation of a driver of the vehicle to irradiate a lateral irradiation region on an outer side in a vehicle-width direction of the forward irradiation region; and a first pattern irradiation part which irradiates a first irradiation region that partially overlaps the forward irradiation region and the lateral irradiation region in an top view in a bright/dark mixed irradiation pattern in which bright regions and dark regions are alternately repeated.

2. The vehicle lighting device according to claim 1, further comprising a second pattern irradiation part which irradiates a second irradiation region more rearwards than the lateral irradiation region in the bright/dark mixed irradiation pattern.

3. The vehicle lighting device according to claim 1, further comprising a second pattern irradiation part which irradiates a second irradiation region more rearwards than the lateral irradiation region in the bright/dark mixed irradiation pattern, wherein the second pattern irradiation part reacts to a right or left turn operation of the driver and lights up.

4. The vehicle lighting device according to claim 1, further comprising a second pattern irradiation part which irradiates a second irradiation region more rearwards than the lateral irradiation region in the bright/dark mixed irradiation pattern, wherein the second pattern irradiation part lights up based on a detection output of a detection device that detects a pedestrian on a side of the vehicle during a right or left turn of the vehicle.

5. The vehicle lighting device according to claim 1, wherein the first pattern irradiation part lights up based on a detection output of a detection device that detects a pedestrian on a side of a travel path of the vehicle.

* * * * *